United States Patent
Cucciniello

(10) Patent No.: US 10,247,590 B2
(45) Date of Patent: Apr. 2, 2019

(54) BALANCING VALVE FOR ADJUSTING THE DISTRIBUTION OF FLUIDS IN MULTIPLE PIPES

(71) Applicant: WATTS INDUSTRIES ITALIA S.r.l., Trento (IT)

(72) Inventor: Alfredo Marco Cucciniello, Trento (IT)

(73) Assignee: WATTS INDUSTRIES ITALIA S.r.l., Trento (IT)

( * ) Notice: Subject to any disclaimer, the term of this patent is extended or adjusted under 35 U.S.C. 154(b) by 0 days.

(21) Appl. No.: 15/660,313

(22) Filed: Jul. 26, 2017

(65) Prior Publication Data
US 2018/0031143 A1    Feb. 1, 2018

(30) Foreign Application Priority Data
Jul. 28, 2016 (IT) .......................... 102016000079436

(51) Int. Cl.
*G01F 1/88* (2006.01)
*F16K 37/00* (2006.01)
(Continued)

(52) U.S. Cl.
CPC .................. *G01F 1/44* (2013.01); *F16K 1/12* (2013.01); *F16K 15/026* (2013.01);
(Continued)

(58) Field of Classification Search
CPC .......... G01F 1/363; G01F 1/366; G01F 1/383; G01F 1/386; G01F 1/42; G01F 1/44;
(Continued)

(56) References Cited

U.S. PATENT DOCUMENTS

| | | | | |
|---|---|---|---|---|
| 4,454,758 A | * | 6/1984 | Miller | ..................... G01F 5/005 73/202 |
| 5,131,612 A | * | 7/1992 | Skantar | ................... B61L 3/002 246/107 |

(Continued)

FOREIGN PATENT DOCUMENTS

| | | |
|---|---|---|
| CN | 203348645 | 12/2013 |
| EP | 1835209 A2 | 9/2007 |

OTHER PUBLICATIONS

Official Search Report, issued by European Patent Office, dated Apr. 7, 2017.

*Primary Examiner* — Atif Chaudry
(74) *Attorney, Agent, or Firm* — Burns & Levinson LLP; George N. Chaclas

(57) ABSTRACT

A balancing valve for adjusting the flow rate of a fluid flowing inside a pipe from upstream to downstream in a longitudinal direction of flow. The balancing valve includes: a check valve and a tubular element simulating a Venturi tube, said valve and element being coaxially connected, respectively, from upstream to downstream in the longitudinal direction of flow of the fluid; a device for detecting the difference in pressure which occurs inside the valve; a valve for adjusting the flow rate of the fluid which flows inside the pipe; wherein: the detection device is arranged between the inside of a first upstream chamber of the check valve and the inside of a central cylindrical portion of the tubular element.

12 Claims, 2 Drawing Sheets

(51) Int. Cl.

| | |
|---|---|
| *G01F 1/36* | (2006.01) |
| *G01F 1/44* | (2006.01) |
| *G01F 1/42* | (2006.01) |
| *G01F 1/32* | (2006.01) |
| *G01F 1/38* | (2006.01) |
| *F16K 1/12* | (2006.01) |
| *F16K 15/02* | (2006.01) |
| *F16K 31/60* | (2006.01) |
| *G05D 7/01* | (2006.01) |
| *F16K 15/06* | (2006.01) |
| *F16K 27/02* | (2006.01) |
| *G01F 15/00* | (2006.01) |

(52) U.S. Cl.
CPC ........ *F16K 15/063* (2013.01); *F16K 27/0209* (2013.01); *F16K 31/60* (2013.01); *F16K 37/005* (2013.01); *F16K 37/0016* (2013.01); *G01F 1/3254* (2013.01); *G01F 1/363* (2013.01); *G01F 1/366* (2013.01); *G01F 1/383* (2013.01); *G01F 1/42* (2013.01); *G01F 1/88* (2013.01); *G01F 15/005* (2013.01); *G05D 7/014* (2013.01); *Y10T 137/8326* (2015.04)

(58) Field of Classification Search
CPC .......... G01F 1/3254; G01F 1/88; G01F 1/005; F16K 37/005; Y10T 137/8326
See application file for complete search history.

(56) References Cited

U.S. PATENT DOCUMENTS

| | | | |
|---|---|---|---|
| 8,479,733 B2* | 7/2013 | Mashak | A61M 16/00 128/205.24 |
| 2002/0101355 A1 | 8/2002 | Young | |
| 2007/0209719 A1* | 9/2007 | Shafique | F16K 5/0605 137/614.2 |

\* cited by examiner

BALANCING VALVE FOR ADJUSTING THE DISTRIBUTION OF FLUIDS IN MULTIPLE PIPES

CROSS REFERENCE TO RELATED APPLICATIONS

This application claims priority under 35 U.S.C. § 119 to Italian Application No. 102016000079436, filed Jul. 28, 2016, entitled BALANCING VALVE FOR ADJUSTING THE DISTRIBUTION OF FLUIDS IN MULTIPLE PIPES, the contents of which are incorporated herein by reference in their entirety for all purposes.

BACKGROUND OF THE INVENTION

1. Field of the Invention

The present disclosure relates to a balancing valve for adjusting the distribution of fluids in multiple pipes.

2. Background of the Related Art

It is known in the technical sector relating to the distribution of fluids in multiple pipes such as, for example, the various branched pipes in heating installations, that there exists the need to measure and adjust, suitably and precisely the flow rate of the fluid flowing in each section of the piping.

For measuring the flow rate of a fluid, US PGPUB NO. 2002/101355 A1 discloses a flow sensor device that has a check valve comprising a moving plate for moving in response to the fluid flow through the sensor, and a biasing means for biasing the plate towards a sensor inlet. In order to measure the flow rate inside the device, a sensor means is provided for sensing the movement of the moving plate and creating a signal relating to its location. The moving plate is composed of a magnetizable material and the sensor means comprises a steel proximity sensor arranged adjacent to the path travelled by the moving plate for sensing the location of the moving plate.

US PGPUB NO. 2002/101355 A1 teaches also measuring a flow rate at a point in a bypass port situated upstream of the check valve and a pressure at a point in a central bypass port coaxially connected downstream of the check valve.

In order to adjust suitably and accurately the flow rate of the fluid flowing in each section of the pipes, valves are also known for intercepting and regulating the flow which can be applied to the pipes, said valves being provided with means for adjusting the flow. The measurement of the flow is performed by means of auxiliary instruments such as:

a device for measuring the difference in pressure associated with the valve and able to detect a pressure difference $\Delta p$ between two points, respectively downstream (pipe) and upstream (valve) of the closing member of the said valve and to communicate the measurement detected to; and processing instruments external to the valve, such as portable computers and the like, which are necessarily supplied to the plant maintenance engineer and are costly and unsuitable for use in environments such as those in which there are boilers and/or fluid distribution equipment.

These devices have numerous drawbacks which basically limit their efficiency and ease of use; in particular, since the measurement is determined by the equation $\Delta p = Q^2/Kv^2$, (Q=flow rate; Kv=mass flow rate), for a precise measurement, the instrument, needs to know a number of intrinsic characteristics of the valve and in particular the configuration thereof identified by means of the valve model, which determines the range of values of Kv which the valve is able to generate, and the position of the closing member which determines, within the range of possible values, the current value of Kv.

In addition to this, the working principle of the valve is based on a complicated procedure of successive approximations which, once the desired flow rate value Q has been fixed, envisages a first adjustment of the position of the closing member by means of a special calibrated knob, a first reading of the $\Delta p$, sending of the measurement to the external instrument, and calculation and display of the flow rate Q; since the flow rate detected will not be that desired it is required to repeat the entire cycle, varying opening/closing of the valve as many times as needed in order to obtain the desired result.

Also known are valves forming a triple-function assembly which performs a measurement of the pressure difference $\Delta p$ using a Venturi tube arranged between an upstream automatic check valve and a downstream/upstream manual adjustment valve.

An example of these valves is described in European patent no. EP 1 835 209, wherein an instrument for measuring a differential pressure is connected, using well-established technology, upstream, to a first portion of the Venturi tube which has a larger cross-section and, downstream, to the central portion of the Venturi tube, which has a narrow cross-section. In this way the measuring instrument detects the $\Delta p$ value corresponding to the variation in pressure which occurs in the motion of the fluid as it passes from ae larger cross-section to a smaller cross-section of the Venturi tube. The instrument therefore merely measures the $\Delta p$ value generated by the Venturi tube alone which is proportional to the square flow rate Q ($\Delta p:Q^2$).

This configuration, using the $\Delta p$ value measured on the Venturi tube for an indirect evaluation of the flow rate, results in limited rangeability values (turndown ratio) corresponding to the typical values of the Venturi tube, which are close to 5:1 for the ratio $$\frac{\Delta p max}{\Delta p min}$$

between a maximum value $\Delta p max$ and a minimum value $\Delta p min$ which the instrument is able to measure.

This limited rangeability is decidedly inadequate, for example, in the case of the typical hydrosanitary applications for which a suitable ratio value is 25:1.

Although fulfilling their function, these known valves therefore have drawbacks since they have a smaller value of the ratio between maximum flow rate and minimum flow rate which can be measured by the instrument (also known as "rangeability" or "turndown ratio").

This means that in practice the known measurement, instruments are necessarily specialized for a specific measurement range, determined by the respective full scale value.

Consequently an instrument which is suitable for measuring high flow rates is not suitable for measuring low flow rates and vice versa; this results in a consequent need for an increase in the types of balancing valves which can be used, and therefore during the warehouse management facilities, careful planning during the design stage, and consequently an increase in the final cost of the valve as a whole.

SUMMARY OF THE PRESENT DISCLOSURE

In view of the above, there is a need for providing a valve for balancing the flow rate of a fluid flowing inside a pipe, which valve should be able to cover measurement ranges and therefore adjustment, ranges which are very wide, ranging from low to high flow rate values.

It is also desirable that the valve should be simple and low-cost to implement and should not require costly external instrumentation, allowing the adjustment to performed also by non-specialized users by means of simple and easy operations.

Moreover said valve preferably does not give rise to excessive head losses in the flow so as not to reduce its efficiency and should not be subject to soiling which over time reduces the legibility of the scale displaying the measurement which is used to determine the adjustment.

These results are obtained according to the present disclosure by a valve according to the subject matter hereinafter disclosed.

It should be appreciated that the subject technology can be implemented and utilized in numerous ways, including without limitation as a process, an apparatus, a system, a device, a method for applications now known and later developed and the like. These and other unique features of the technology disclosed herein will become more readily apparent from the following description and the accompanying drawings.

BRIEF DESCRIPTION OF THE DRAWINGS

Further details may be obtained from the following description of non-limiting examples of embodiment of the subject of the present disclosure, provided with reference to the accompanying drawings.

DETAILED DESCRIPTION OF PREFERRED EMBODIMENTS

Figure 1:
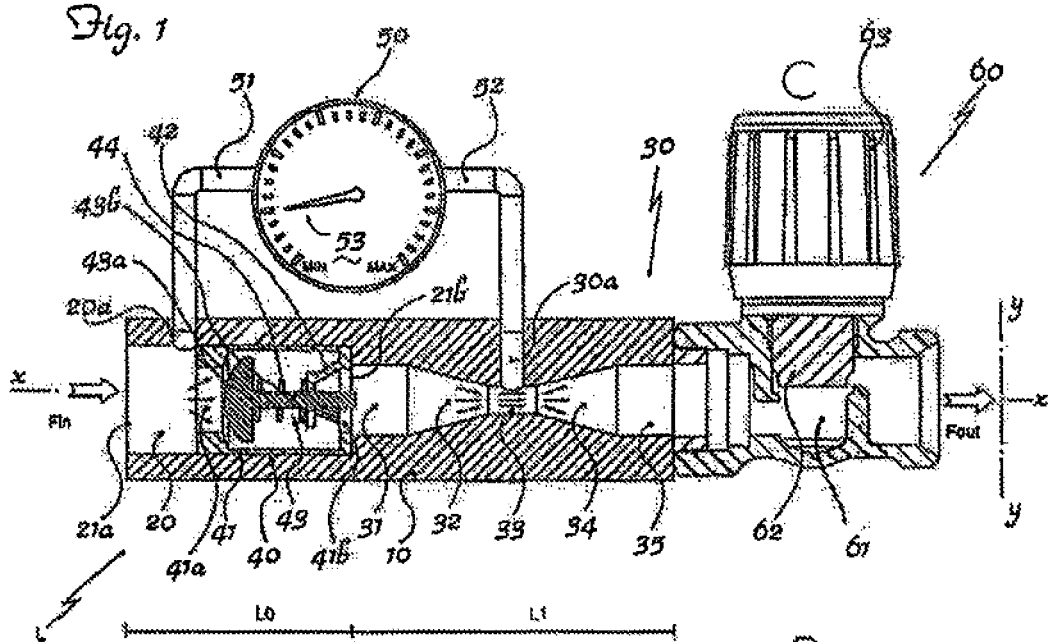
FIG. 1: shows a cross-sectional view of an example of a balancing valve according to the present disclosure with an adjustment valve in the minimum flow rate condition.

The subject technology overcomes many of the prior art problems associated with balancing valves. The advantages, and other features of the technology disclosed herein, will become more readily apparent to those having ordinary skill in the art, from the following detailed description of certain preferred embodiments taken in conjunction with the drawings which set forth representative embodiments of the present technology and wherein like reference numerals identify similar structural elements. Directional indications such as upstream, downstream, right, left and the like are used with respect to the figures and not meant in a limiting manner.

As shown in FIG. 1 and assuming solely for the sake of easier description and without any limiting meaning a pair of reference axes having, respectively, a longitudinal direction X-X, parallel, to the direction of flow of the fluid and transverse/radial direction Y-Y orthogonal to the preceding direction, an upstream part corresponding to the inlet or part for entry into the same of the fluid $F_{in}$ and a downstream part or outlet opposite to the preceding part and corresponding to the outlet or part for outflow of the fluid $F_{out}$.

A valve for adjusting the flow rate Q of a fluid F in a pipe according to the subject disclosure includes an axially extending assembly comprising: a first upstream part 50 consisting of an instrument for measuring the pressure difference Δp; and a second downstream part consisting of an adjustment valve 60, the two parts 50, 60 being incorporated in a tubular body 100 extending in a longitudinal axial direction X-X.

In detail, the tubular body 100 includes a first axial portion L divided along the longitudinal direction X-X into two portions of respective length $L_0$ and $L_1$ arranged in series with each other and comprising from upstream to downstream. The tubular body 100 also defines a first cylindrical chamber 20 with a given inner diameter $d_{20}$, extending between an upstream opening 21a and a downstream opening 21b (see FIG. 2).

A check valve 40 includes a substantially cylindrical body 41 with an outer diameter d40 such that the check valve 40 may be coaxially inserted inside the chamber 20. The cylindrical body 41 has an upstream opening 41a, communicating with the first upstream chamber 20, and a downstream opening 41b communicating with a second chamber 30 that simulates a Venturi cube. The check valve 40 houses internally a closing member 43 displaceable in both senses of the longitudinal direction X-X and comprising a head 43a, designed to interfere so as to close/open the upstream opening 41a of the valve 40, and a shank 43b integral with the head 43a.

The movement of the closing member 43 in the longitudinal direction X-X is preferably guided by a relief 42 which is integral with the front downstream surface of the body 41 of the valve 40 and inside which the shank 43b slides.

A spring 44 is coaxially arranged between the guiding relief 42 and the head 43a of the closing member and is calibrated to provide a suitable resistance to sliding of the closing member and therefore opening of the upstream aperture 21a.

A second chamber 30 which, from upstream to downstream, comprises at least a second portion with a frustoconical shape 32 with its greater base situated upstream, and a third central cylindrical portion 33 with a smaller cross-section substantially corresponding to that of the smaller base of the second portion 32 and, as shown in the example of FIG. 1, smaller than the diameter $d_{20}$ of the first upstream chamber 20. Optionally, a fourth portion 34 may be a frustoconical cross-section having its larger base directed downstream.

Preferably, it is envisioned that there may be a first cylindrical portion 31 with a given cross-section and/or a fifth portion 35 with a cylindrical cross-section for discharging the fluid $F_{out}$.

The set of portions forming the chamber 30 simulates substantially a Venturi tube, the upstream aperture of which is connected to the downstream opening 41b of the check valve and the downstream aperture of which forms the outlet for fluid $F_{out}$ from the measuring instrument.

A device 50 for detecting a difference in pressure Δp is provided between the first upstream chamber 20 communicating with the upstream opening of the check valve 40 and the central cylindrical portion 33 of the second chamber 30. The detection device 50 is connected by means of an upstream pipe 51 to the upstream chamber 20 and by means of a downstream pipe to the said central cylindrical portion 33 of the second chamber 30 and comprises a dial face 53, analog in the example shown, for indicating the pressure difference value Δp detected.

With this arrangement of the connections of the upstream pipe 51 and downstream pipe 52, the instrument is able to detect the variation in pressure across the assembly composed of the check valve 20 and the Venturi tube 30.

Downstream of the detection device 50 a flow rate adjustment valve 60 is applied axially in relation to the Venturi tube and comprises a seat 61 on which a closing member 62 acts so as to open and close it, said closing member being operated by a knob 63 which can be rotationally operated by the operator.

With this configuration the operating principle of the valve for balancing the flow rate according to the subject disclosure is as follows. The tubular portion 10 is inserted inside the pipe section (not shown) for which the flow rate of the fluid flowing inside therethrough is to be determined. The fluid flow $F_{in}$ is opened by means of the adjustment valve 60 and enters into the first chamber 20 and then into the check valve 40 with a pressure P1 which produces a thrust on the closing member 43 which overcomes the force of the spring 44 and opens the check valve. Once the check valve 40 is open, the fluid flows through the check valve 40 and, flowing out from the downstream opening 41b, enters into the second portion 30 of the instrument where the fluid undergoes compression/expansion produced by the dimensions of the portions 32, 33, 34 of the Venturi tube. During these stages, variations in speed and pressure are produced with substantially zero balancing and, in particular, a pressure value P2 in the central cylindrical portion 33, having a diameter smaller than the diameter of the first chamber 20, which is connected to the downstream pipe 52 of the detection device 50.

The detection device 50 detects the pressure difference Δp=P2−P1, providing an indication of its value on the dial face 53. With the indication, of the value Δp, it is possible in a conventional manner established in the technical reference sector to consult, the graph (FIG. 3) showing Flow rate Q versus pressure difference Δp associated with the measuring instrument and obtain with precision the flow rate of the fluid flowing inside the pipe. The displacement of the closing member 43 varies depending on the flow rate of the fluid flowing inside the valve.

Figure 2:
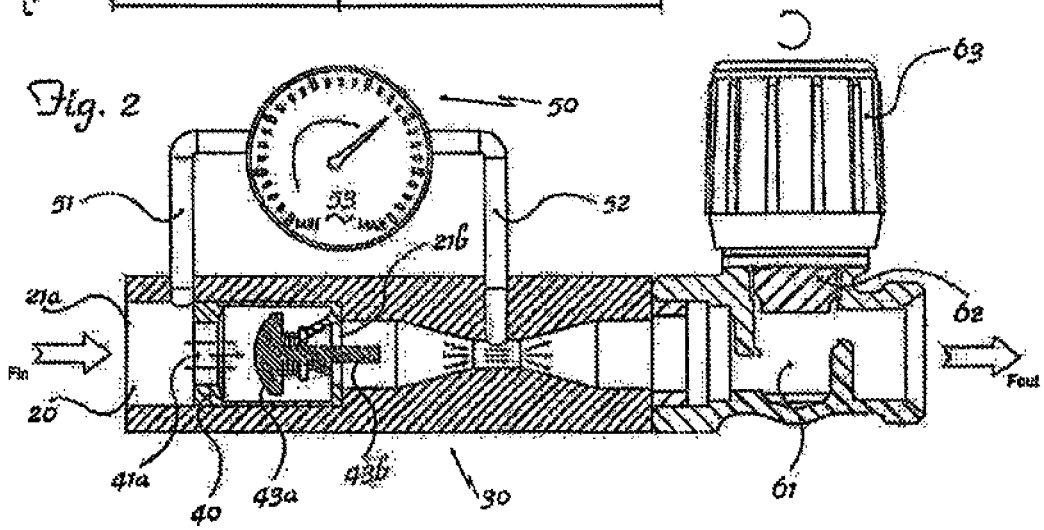
FIG. 2: shows a cross-sectional view of an example of a balancing valve according to the present disclosure with an adjustment valve in the maximum flow rate condition.

As shown in FIG. 2, any increase in the flow rate of the fluid $F_{in}$ produces a greater thrust on the closing member 43 which, overcoming the resistance of the spring 44, moves downstream, opening more fully the check valve 40 so as to allow the greater fluid, flow $F_{in}$ to pass through. At approximately the same time, an increase of the value of Δp=P2−P1 occurs and the measurement thereof is shown on the analog dial face 53.

Figure 3:
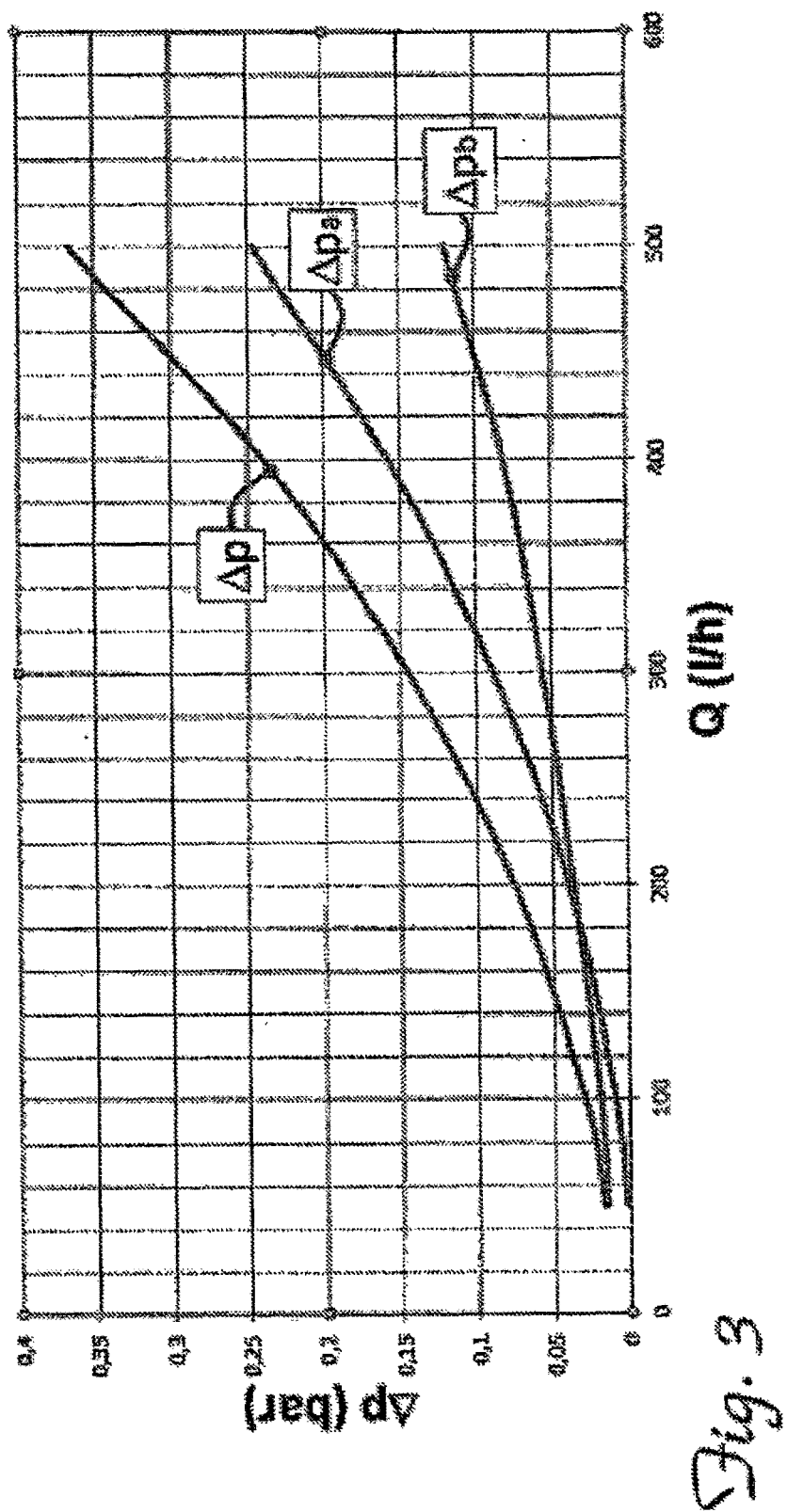
FIG. 3: shows a graph for the measurement of the adjustment able to be implemented with the valve according to the present disclosure.

As can be seen from the graph in FIG. 3, the locus of the points for the pressure difference values is a curve Δp always resulting from a combination of the curve Δpb, which expresses the head loss occurring across the check valve 40 upstream, and the curve Δpa, which instead expresses the variation in pressure referable to the downstream portion 30 which simulates the Venturi tube. It is noted that, despite the fact that the resultant curve Δp represents a combination of the two values, at the low flow rates the contribution to the measurement made by the Venturi tube is negligible, while at the high flow rates the contribution provided by the fluid flowing through the check valve becomes negligible.

If the flow rate of the fluid is to be adjusted, at this point the knob 63 of the adjustment valve 60 is operated so as to open or close it more and consequently vary the flow rate.

It is therefore clear how the balancing valve according to the subject, disclosure is constructed in a simple, low-cost and reliable manner and is able to measure and adjust with suitable precision the flow rate of a fluid inside a piping even where there exist considerable differences between low flow rates and high flow rates, and without the need, for an external measuring instrument, thereby solving the technical problem of the prior art which requires different instruments with different full scale values for measuring flow rates having values very different from each other.

Moreover, display of the measurement is always clear and precise over time, since the dial face of the detection device is not passed through by the fluid, avoiding the accumulation of dirt on the said dial face.

Although not shown, it is also envisaged that the adjustment valve 60 may be connected upstream of the shut-off valve 40. In addition the following may be differently envisaged: measurement display dial faces, which are for example digital instead of analog; and dimensions for the lengths $L_0$, $L_1$, and diameters $d_{20}$, $d_{40}$ of the chamber 20 and the valve 40, respectively, and for the lengths and cross-sections of the different portions of the chamber 30 simulating a Venturi tube, and/or the introduction of differential transducers for the remote transmission of the signal representing the measurement of the flow rate.

All patents, patent applications and other references disclosed herein are hereby expressly incorporated in their entireties by reference. Although described in connection with a number of embodiments and a number of preferred examples of embodiment of the subject disclosure, it is understood that the scope of protection of the present patent is determined solely by the claims below.

The invention claimed is:

1. A balancing valve for adjusting a flow rate of a liquid fluid flowing inside a pipe from upstream to downstream in a longitudinal direction of flow, the balancing valve comprising:
    a check valve and a tubular element configured to simulate a Venturi tube, said check valve and said tubular element being coaxially connected, respectively, from upstream to downstream in the longitudinal direction of flow of the liquid fluid;
    a device configured to detect a differential pressure, which occurs inside the balancing valve between a first inside of a first chamber upstream of the check valve and communicating therewith and a second inside of a central cylindrical portion of the tubular element, wherein the device is configured to measure the differential pressure that is a combination of a head loss occurring across the check valve and of a variation in pressure referable to the tubular element simulating a Venturi tube, whereby at low flow rates the differential pressure is largely created by the check valve and at high flow rates the differential pressure is largely created by the simulated Venturi tube; and
    a valve configured to adjust the flow rate of the liquid fluid which flows inside the pipe.

2. A balancing valve according to claim 1, wherein the check valve comprises a substantially cylindrical body of suitable outer diameter provided with an upstream opening, communicating with said first upstream chamber, and a downstream opening, a closing member translatable in both senses of the longitudinal direction being inserted inside the valve, under the thrusting action of the liquid fluid or the thrusting action of a spring in the opposite direction.

3. A balancing valve according to claim 1, wherein the tubular element comprises at least:

a second portion of frustoconical shape with its greater base directed upstream and smaller base directed downstream;

a third, central, cylindrical portion with a smaller cross-section substantially corresponding to the smaller base of the second frustoconical portion; and a fourth portion with a frustoconical cross-section having its larger base directed downstream, wherein the portions are arranged in series along the longitudinal direction of flow.

4. A balancing valve according to claim 3, wherein the tubular element comprises a first cylindrical portion with a given cross-section arranged upstream of said second frustoconical portion.

5. A balancing valve according to claim 3, wherein the tubular element comprises a fifth portion with a cylindrical cross-section arranged downstream of the said fourth frustoconical portion, for discharging of the liquid fluid.

6. A balancing valve according to claim 1, wherein the detection device is connected by means of an upstream pipe to the upstream chamber and by means of a downstream pipe to the said central cylindrical portion of the tubular element.

7. A balancing valve according to claim 1, wherein the measuring device comprises a dial face showing the value of the difference in pressure detected.

8. A balancing valve for adjusting a flow rate of a liquid fluid flowing inside a pipe from upstream to downstream in a longitudinal direction of flow, the balancing valve comprising:

a check valve;

a tubular element coaxially connected downstream to the check valve along the longitudinal direction of flow of the liquid fluid, the tubular element having a central cylindrical portion of a relatively smaller cross-section for simulating a Venturi tube;

a detection device configured to detect a differential pressure between inside a first chamber upstream of the check valve and the central cylindrical portion, wherein the detection device is configured to measure the differential pressure largely created by a head loss occurring across the check valve at low flow rates and, at high flow rates, largely created by a variation in pressure across to the tubular element simulating the Venturi tube; and a valve for adjusting the flow rate of the liquid fluid which flows inside the pipe.

9. A balancing valve according to claim 8, wherein:

the check valve comprises: a substantially cylindrical body of suitable outer diameter provided with an upstream opening, communicating with a first upstream chamber, and a downstream opening; a closing member mounted for movement along the longitudinal direction inside the check valve, under the thrusting action of the liquid fluid in a first direction; and a spring coupled to the closing member for providing a thrusting force in a second direction substantially opposite the first direction.

10. A balancing valve according to claim 8, wherein the tubular element comprises at least:

a second portion of frustoconical shape being upstream of the central cylindrical portion with its greater base directed upstream and smaller base directed downstream; and a third portion with a frustoconical cross-section being downstream of the central cylindrical portion having its larger base directed downstream, wherein the portions are arranged in series along the longitudinal direction of flow.

11. A balancing valve according to claim 10, wherein the tubular element comprises: a first cylindrical portion with a given cross-section arranged upstream of said second frustoconical portion; and a fourth portion with a cylindrical cross-section arranged downstream of the said third frustoconical portion, for discharging of the liquid fluid.

12. A balancing valve according to claim 8, wherein: the detection device is connected by means of an upstream pipe to the upstream chamber and by means of a downstream pipe to the central cylindrical portion of the tubular element; and the measuring device comprises a dial face showing the value of the difference in pressure detected.

* * * * *